Patented Mar. 27, 1928.

1,663,569

UNITED STATES PATENT OFFICE.

WILHELM SCHULENBURG, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PREPARATION OF CAMPHENE.

No Drawing. Application filed February 26, 1927, Serial No. 171,373, and in Germany February 27, 1926.

This invention refers to the preparation of camphene, which, as is well known, presents an important intermediate phase in the preparation of artificial camphor from pinene hydrochloride through the splitting out of hydrogen chloride. There are already a number of methods which have been described for causing the necessary splitting out of hydrochloric acid, all of which, however, retain more or less serious defects.

I have found, that the splitting out of hydrochloric acid proceeds in an exceptionally smooth manner with the production of practically quantitative yields of camphene if the removal of hydrochloric acid comes about through the action of alkali monoxide, as for example, sodium monoxide. The action of sodium monoxide on pinene hydrochloride proceeds with the evolution of heat. Surprisingly however, no further reaction with the hydrocarbon produced takes place in spite of the very great reactivity of sodium oxide, even when a large excess of $Na_2O$ is used, for example up to 3 mols sodium monoxide for one mol of pinene hydrochloride.

Example.

A small quantity of pinene hydrochloride and an excess of sodium monoxide are heated while excluded from moisture and in suitable contact, in an apparatus provided with a reflux condenser and stirrer. The boiling point gradually goes down over a period of 4 hours from about 210° to 158-160° C. The heating under reflux is then continued for another hour, whereupon the camphene formed is distilled off either at atmospheric or diminished pressure. The mixture of sodium chloride and sodium oxide remaining behind in the reaction vessel can be utilized, for example, by working it up further into caustic soda.

By the rigorous exclusion of moisture and suitable arrangements for mixing the reactants, the above example can be carried out using only a small excess of sodium monoxide, especially if a large quantity of pinene hydrochloride is worked up at one time. The yields are excellent, well above 90%, the product is chlorine free and is separated from the residual sodium chloride and sodium monoxide by a simple distillation. In place of pinene hydrochloride its isomer bornyl chloride can be used with the same procedure and results, therefore in the appended claims I intend the term "pinene hydrochloride" to include bornyl chloride.

What I claim is:

1. The method for the preparation of camphene from pinene hydrochloride through the splitting out of hydrochloric acid, by means of alkali metal monoxide.

2. The method for the preparation of camphene from pinene hydrochloride through the splitting out of hydrochloric acid, by means of sodium monoxide.

3. The method of preparing camphene consisting in refluxing pinene hydrochloride with an excess of alkali metal monoxide until the boiling point of the reaction mixture indicates the completion of the reaction and then distilling off the camphene formed.

4. The method of preparing camphene consisting in refluxing pinene hydrochloride with an excess of sodium monoxide until the boiling point of the reaction mixture indicates the completion of the reaction and then distilling off the camphene formed.

Signed at Frankfort-on-the-Main, Germany, this 12th day of Feby. A. D. 1927.

WILHELM SCHULENBURG.